United States Patent
Igasaki et al.

(10) Patent No.: US 10,845,580 B2
(45) Date of Patent: Nov. 24, 2020

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Shiro Igasaki, Kanagawa (JP); Nobuo Ohba, Kanagawa (JP); Koji Kubo, Tokyo (JP); Takahisa Ootake, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 189 days.

(21) Appl. No.: 15/947,144

(22) Filed: Apr. 6, 2018

(65) Prior Publication Data
US 2018/0314042 A1    Nov. 1, 2018

(30) Foreign Application Priority Data
Apr. 28, 2017  (JP) ................. 2017-089577

(51) Int. Cl.
*G02B 15/14* (2006.01)
*H04N 5/225* (2006.01)
(Continued)

(52) U.S. Cl.
CPC .......... *G02B 15/14* (2013.01); *G02B 3/0087* (2013.01); *G02B 3/14* (2013.01); *G02B 7/08* (2013.01);
(Continued)

(58) Field of Classification Search
CPC ........ G02B 15/14; G02B 3/0087; G02B 3/14; G02B 7/08; G02B 7/28; G06K 9/3241;
(Continued)

(56) References Cited

U.S. PATENT DOCUMENTS 9,961,253 B2 *  5/2018  Bryll .................. H04N 5/23216
2010/0177376 A1  7/2010  Arnold et al.
(Continued)

FOREIGN PATENT DOCUMENTS

| JP | 2000-019472 A | 1/2000 |
| JP | 2013-061549 A | 4/2013 |
| JP | 2015-185923 A | 10/2015 |

OTHER PUBLICATIONS

Office Action issued in Japanese Counterpart Patent Appl. No. 2017-089577, dated Sep. 29, 2020, along with an English translation thereof.

*Primary Examiner* — Joseph P Martinez
*Assistant Examiner* — Vipin Patel
(74) *Attorney, Agent, or Firm* — Greenblum & Bernstein, P.L.C.

(57) ABSTRACT

A variable focal length lens device includes: a lens system whose refractive index changes depending on an inputted drive signal; an objective lens disposed in an optical axis common to the lens system; an image detector for detecting an image of a target object through the lens system and the objective lens; a resonance-lock controller for locking the frequency of the drive signal to a resonance frequency of the lens system; and a resonance-lock operation unit for switching enabling and suspending the resonance-lock controller.

5 Claims, 9 Drawing Sheets

(51) Int. Cl.
  *H04N 5/232*  (2006.01)
  *G06K 9/32*  (2006.01)
  *G02B 7/08*  (2006.01)
  *G02B 3/14*  (2006.01)
  *G02B 7/28*  (2006.01)
  *G02B 3/00*  (2006.01)

(52) U.S. Cl.
  CPC ............ *G02B 7/28* (2013.01); *G06K 9/3241* (2013.01); *H04N 5/2253* (2013.01); *H04N 5/2256* (2013.01); *H04N 5/232* (2013.01); *H04N 5/23212* (2013.01); *H04N 5/2254* (2013.01)

(58) Field of Classification Search
  CPC .. H04N 5/2253; H04N 5/2254; H04N 5/2256; H04N 5/232; H04N 5/23212
  See application file for complete search history.

(56) References Cited

U.S. PATENT DOCUMENTS

| | | | |
|---|---|---|---|
| 2017/0013185 A1* | 1/2017 | Gladnick | H04N 5/23212 |
| 2017/0285318 A1 | 10/2017 | Cho et al. | |
| 2018/0180774 A1* | 6/2018 | Nagahama | G02B 3/14 |
| 2018/0314033 A1* | 11/2018 | Sakai | G06F 3/048 |
| 2018/0314041 A1* | 11/2018 | Igasaki | G02B 7/28 |

* cited by examiner

VARIABLE FOCAL LENGTH LENS DEVICE AND VARIABLE FOCAL LENGTH LENS CONTROL METHOD

The entire disclosure of Japanese Patent Application No. 2017-089577 filed Apr. 28, 2017 is expressly incorporated by reference herein.

TECHNICAL FIELD

The present invention relates to a variable focal length lens device and a variable focal length lens control method.

BACKGROUND ART

A variable focal length lens device employing, for instance, a liquid lens system (simply referred to as a "lens system" hereinafter) based on a principle disclosed in Patent Literature 1 (U.S. Pre-Grant Patent Publication No. 2010/0177376) has been developed.

The lens system includes a cylindrical oscillator made of a piezoelectric material that is immersed in a transparent liquid. When an alternating-current (AC) voltage is applied to an inner circumferential surface and an outer circumferential surface of the oscillator of the lens system, the oscillator expands and contracts in a thickness direction thereof to oscillate the liquid inside the oscillator. Then, when the frequency of the applied AC voltage is tuned to an intrinsic frequency of the liquid, a concentric standing wave is created in the liquid to form concentric regions of different refractive indexes around a center axis of the oscillator. Accordingly, when light is introduced into the oscillator of the lens system along the center axis of the oscillator, the light follows a diverging or converging path depending on the refractive index of each of the concentric regions.

The variable focal length lens device includes the above-described lens system and a focusing objective lens (e.g. a typical convex lens or lens group), which are disposed on a common optical axis.

When a parallel light enters a typical objective lens, the light having passed through the lens is focused at a focus position located at a predetermined focal length from the lens. In contrast, when a parallel light enters the lens system disposed coaxially with the objective lens, the light is diverged or converged by the lens system, so that the light having passed through the objective lens is focused at a position closer or farther than the original focus position (i.e. the focus position without the lens system).

Accordingly, an amplitude of a drive signal (an AC voltage of a frequency forming a standing wave in the liquid inside the lens system) inputted to the lens system is increased or decreased in the variable focal length lens device, thereby controlling the focus position of the variable focal length lens device as desired within a predetermined range (i.e. a range with a predetermined variation width capable of being added to/subtracted from the focal length of the objective lens using the lens system).

A sinusoidal AC signal is exemplarily used for the drive signal inputted to the lens system of the variable focal length lens device. When such a sinusoidal drive signal is inputted, the focal length (focus position) of the variable focal length lens device sinusoidally changes. At this time, when the voltage value of the drive signal is 0, the light passing through the lens system is not refracted and the focal length of the variable focal length lens device becomes equal to the focal length of the objective lens. When the voltage of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sine wave of the drive signal to perform a pulsed illumination. Such pulsed illumination on an object at a desired focal length among the sinusoidally changing focal lengths allows for detection of the image of the object at the focal length. When the pulsed illumination is performed at a plurality of phases in one cycle and the image is detected at a timing corresponding to each of the phases, images at a plurality of focal lengths can be obtained in the cycle.

In the variable focal length lens device, a temperature of the liquid inside the above-described lens system and a temperature of the oscillator change by being affected by an ambient temperature and/or a heat generated as a result of the operation of the lens system. An intrinsic frequency also changes due to the temperature change, resulting in a change in a frequency (resonance frequency) of the AC signal forming the standing wave. If the drive signal inputted to the lens system remains the same as the drive signal before the temperature change, the drive signal is deviated from a peak of the resonance frequency, thus failing to efficiently forming the standing wave.

A resonance-lock system, which allows the drive signal to be automatically locked to the changed resonance frequency, has thus been used. For instance, it is supposed that a drive signal of a predetermined frequency, at which an intensity level of the standing wave is maximized, is inputted to the lens system. If the level of the standing wave is declined, it is determined that the frequency of the drive signal is deviated from the peak of the resonance capable of forming the standing wave in the lens system, and the frequency of the drive signal is tuned to a new peak position by raising or lowering the frequency of the drive signal. When the frequency of the drive signal reaches the new peak position, the level of the standing wave can be restored to the maximum intensity. Such tuning to the peak position is continuously conducted to achieve the automatic locking (resonance lock) to the resonance frequency, at which the standing wave is formed.

The above-described variable focal length lens device, in which the frequency of the drive signal is automatically tuned to the frequency capable of forming the standing wave (resonance lock), can constantly form the efficient standing wave.

However, the change in the frequency by the resonance lock during, for instance, the image detection process of the variable focal length lens device with the resonance lock function results in a change in the timing for providing the same focal length and consequent reduction in the accuracy of the obtainable image.

SUMMARY OF THE INVENTION

An object of the invention is to provide a variable focal length lens device and a variable focal length lens control method capable of efficiently forming a standing wave and obtaining a highly accurate image.

A variable focal length lens device according to an aspect of the invention includes: a lens system whose refractive index is variable depending on an inputted drive signal; an objective lens disposed in an optical axis common to the lens system; an image detector configured to detect an image of a target object through the lens system and the objective lens; a resonance-lock controller configured to lock a frequency of the drive signal to a resonance frequency of the lens system, and a resonance-lock operation unit configured to switch enabling and suspending the resonance-lock controller.

In the above aspect of the invention, when the resonance-lock operation unit enables the resonance-lock controller, the frequency of the drive signal can be automatically tuned to the peak of the current resonance frequency of the lens system to efficiently form the standing wave.

In contrast, when the image is detected by the image detector, the resonance-lock operation unit temporarily suspends the automatic tuning by the resonance-lock controller to keep the frequency of the drive signal at a constant level. As a result, the focal length of the lens system is stabilized during the image detection, so that an image with a high accuracy can be obtained.

It should be noted that the resonance lock operation may be the same as an existing resonance lock operation.

In the variable focal length lens device of the above aspect of the invention, it is preferable that the resonance-lock operation unit is configured to suspend the resonance-lock controller in synchronization with an image-detecting operation by the image detector.

According to the above arrangement, the resonance lock is automatically suspended in synchronization with the image-detecting operation without requiring a user's operation, thereby avoiding a mistake of, for instance, forgetting to enable the operation unit.

In the variable focal length lens device of the above aspect of the invention, it is preferable that the resonance-lock operation unit is configured to be selectively set in a lock-suspension mode, in which the resonance-lock operation unit suspends the resonance-lock controller in synchronization with the image-detecting operation of the image detector, and in a lock-continuation mode, in which the resonance-lock controller is not suspended in synchronization with the image-detecting operation of the image detector.

According to the above arrangement, the selection of the lock-suspension mode allows a user to obtain the above-described highly accurate image, while the selection of the lock-continuation mode is beneficial when it is not necessary to automatically suspend the resonance-lock controller.

In the variable focal length lens device according to the above aspect of the invention, it is preferable that the resonance-lock controller conducts a resuming operation for locking the frequency of the drive signal to the resonance frequency of the lens system when the resonance-lock operation unit cancels the suspension of the automatic tuning.

In the above arrangement, even when the resonance frequency of the lens system is further changed while the resonance-lock controller is suspended to keep the frequency of the drive signal at a constant level, the frequency of the drive signal can be locked to the current resonance frequency by the resuming operation, so that the subsequent automatic tuning by the resonance lock can be appropriately conducted. The resuming operation for resuming the automatic tuning may be achieved only by the typical resonance lock function when a suspension time is short and the change in the resonance frequency is small. In contrast, when the suspension time is relatively long and the change in the resonance frequency may become large, the resuming operation may be achieved by: scanning a predetermined range of the frequency around the resonance frequency at the time of the suspension to detect the current resonance frequency; and resuming the automatic tuning based on the detected current resonance frequency.

A method according to another aspect of the invention controls a variable focal length lens device including: a lens system whose refractive index is variable depending on an inputted drive signal; an objective lens disposed in an optical axis common to the lens system; an image detector configured to detect an image of a target object through the lens system and the objective lens; and a resonance-lock controller configured to lock a frequency of the drive signal to a resonance frequency of the lens system. The method includes: enabling the resonance-lock controller when the image is not detected by the image detector; and suspending the resonance-lock controller when the image detector detects the image.

According to the above aspects of the invention, a variable focal length lens device and a method of controlling the variable focal length lens capable of efficiently forming the standing wave and obtaining an image with a high accuracy can be provided.

BRIEF DESCRIPTION OF DRAWING(S)

DESCRIPTION OF EMBODIMENT(S)

Exemplary embodiment(s) of the invention will be described below with reference to the attached drawings.

Figure 1:
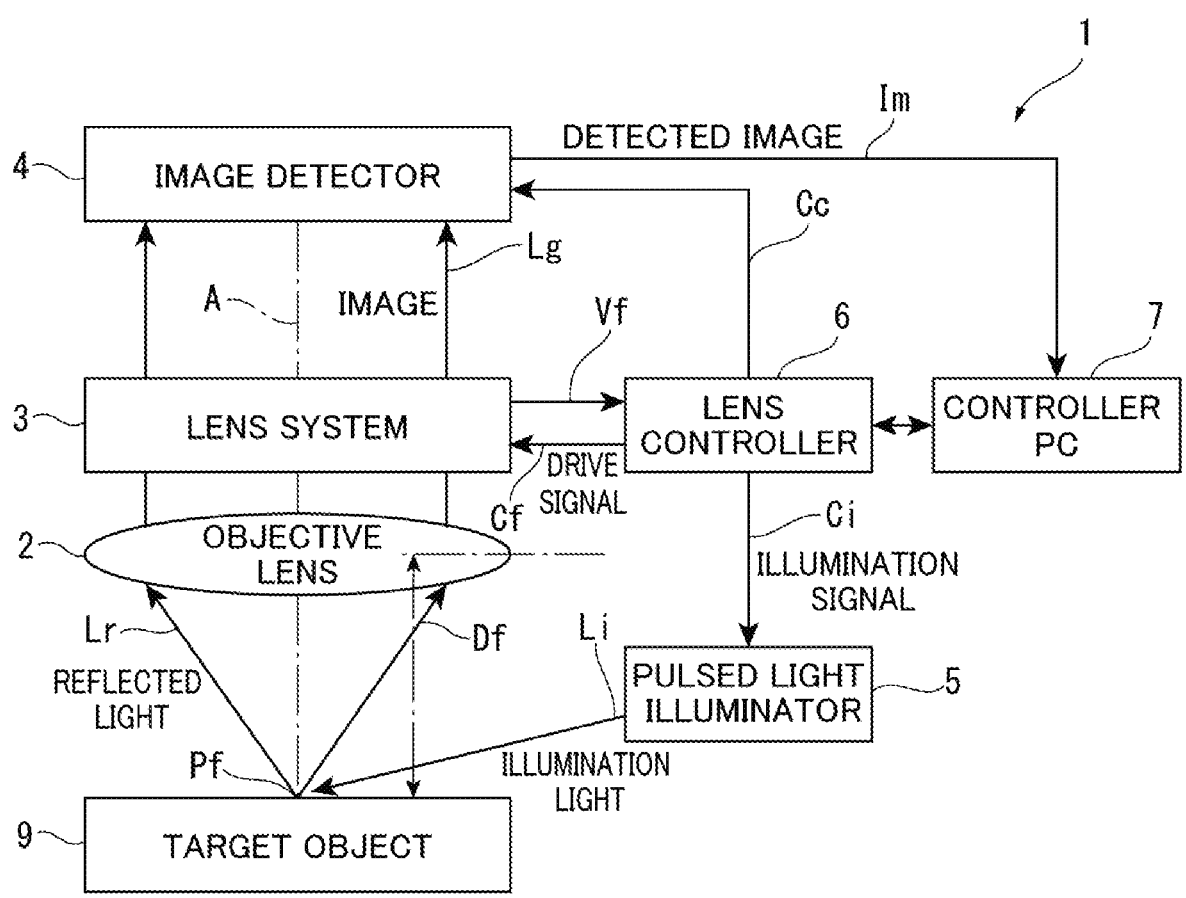
FIG. 1 is a schematic illustration showing an exemplary embodiment of the invention.

As shown in FIG. 1, in order to detect an image of a surface of a target object 9 while changing a focal length, a variable focal length lens device 1 includes: an objective lens 2; a lens system 3; and an image detector 4, the objective lens 2, the lens system 3 and the image detector 4 being disposed on a common optical axis A intersecting the surface of the target object 9.

The variable focal length lens device 1 further includes: a pulsed light illuminator 5 configured to apply pulsed illumination on the surface of the target object 9; a lens controller 6 configured to control operations of the lens system 3 and the pulsed light illuminator 5; and a controller PC 7 configured to operate the lens controller 6.

An existing personal computer is used as the controller PC 7. The desired function of the controller PC 7 is achieved by running a predetermined control software on the controller PC 7. The controller PC 7 is also configured to capture and process an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controller PC 7 in a form of a detected image Im of a predetermined format.

The pulsed light illuminator 5 includes a light-emitting element such as a light emitting diode (LED). The pulsed light illuminator 5 is configured to emit an illumination light Li only for a predetermined time to apply the pulsed illumination on the surface of the target object 9 when an illumination signal Ci is inputted from the lens controller 6. The illumination light Li is reflected at the surface of the target object 9. A reflected light Lr from the surface of the target object 9 forms the image Lg through the objective lens 2 and the lens system 3.

The lens system 3 is configured to change a refractive index thereof depending on a drive signal Cf inputted by the lens controller 6. The drive signal Cf is a sinusoidal AC signal of a frequency capable of forming a standing wave in the lens system 3.

A focal length Df to a focus position Pf of the variable focal length lens device 1 can be changed as desired based on a focal length of the objective lens 2 by changing the refractive index of the lens system 3.

Figure 2:
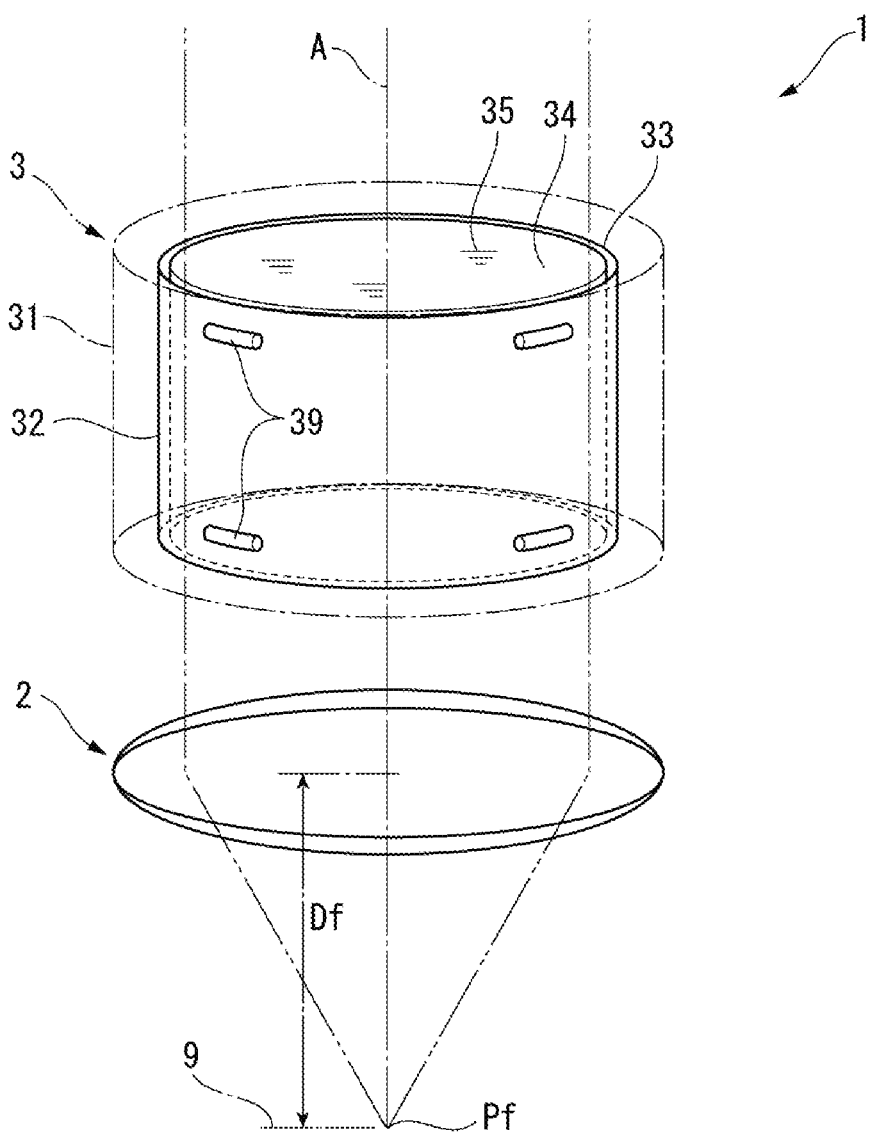
FIG. 2 is a schematic illustration showing an arrangement of a lens system according to the exemplary embodiment.

As shown in FIG. 2, the lens system 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

A highly transparent liquid 35 is filled in the case 31. The oscillator 32 is entirely immersed in the liquid 35 and an interior of the cylindrical oscillator 32 is filled with the liquid 35. The frequency of the AC voltage of the drive signal Cf is tuned to a frequency capable of forming a standing wave in the liquid 35 inside the oscillator 32.

Figure 3:
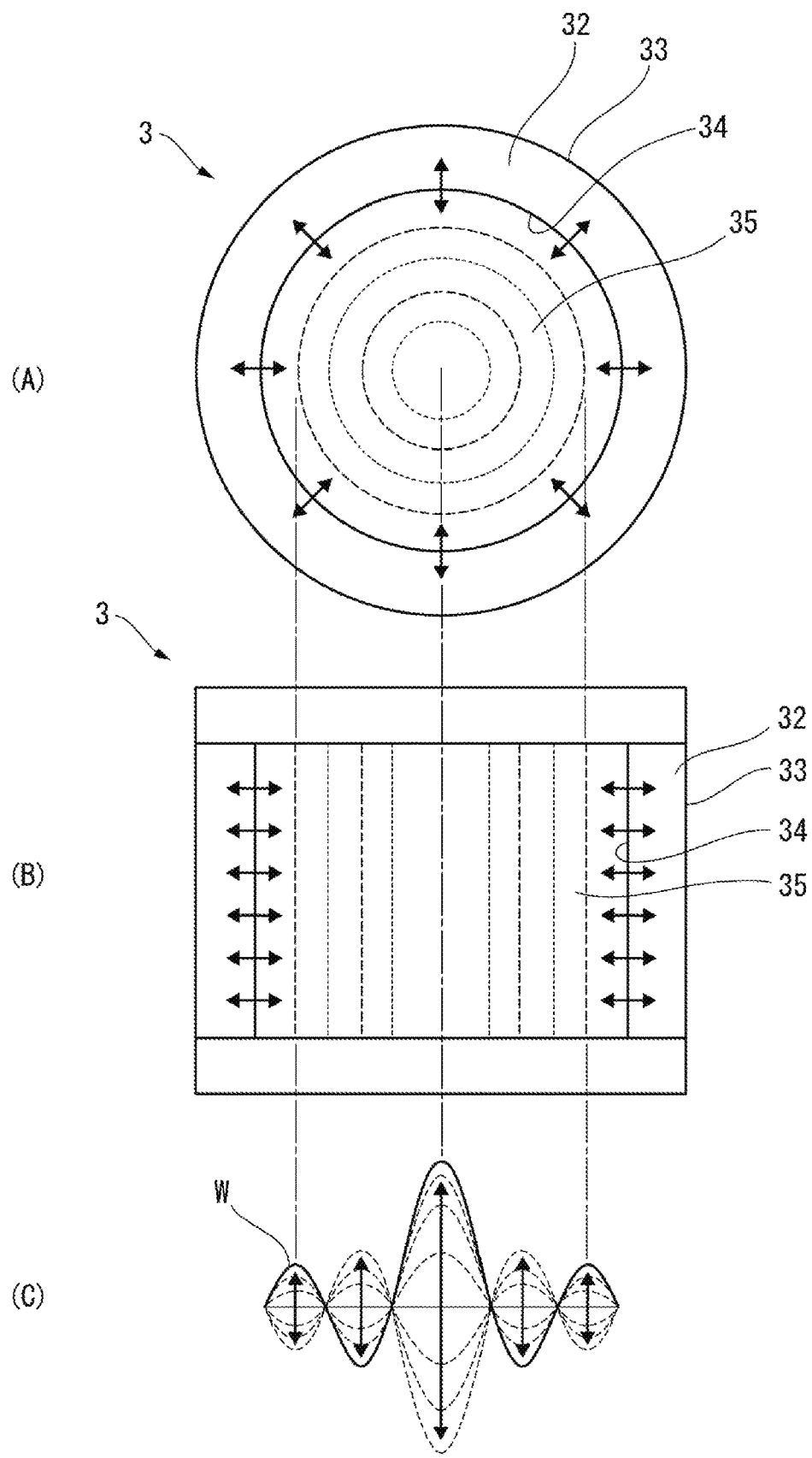
FIG. 3 is a schematic illustration showing an oscillating state of the lens system according to the exemplary embodiment.

As shown in FIG. 3, when the oscillator 32 is oscillated, a standing wave is formed in the liquid 35 in the lens system 3 to create concentric regions with alternating refractive indexes (see FIGS. 3(A) and 3(B)).

A relationship between a distance (radius) from a central axis of the lens system 3 and the refractive index of the liquid 35 at this time is represented by a refractive index distribution W shown in FIG. 3(C).

Figure 4:
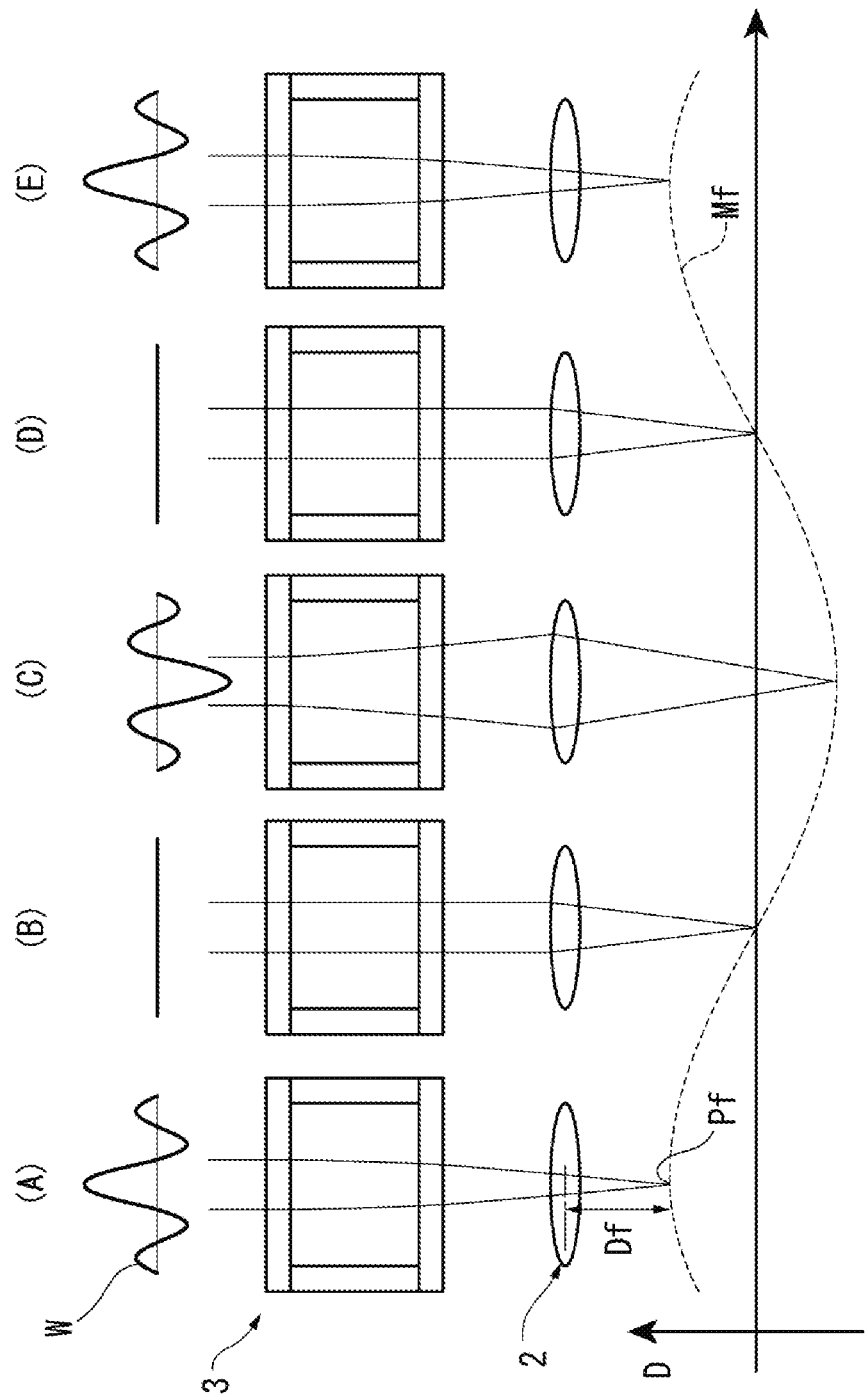
FIG. 4 is a schematic illustration showing a focal length of the lens system according to the exemplary embodiment.

As shown in FIG. 4, since the drive signal Cf is a sinusoidal AC signal, a variation width of the refractive index distribution W of the liquid 35 in the lens system 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the lens system 3 converges the light passing therethrough, the focus position Pf is located close to the lens system 3 and the focal length Df is shortest.

The refractive index distribution W is flat in the state shown in FIG. 4(B), where the lens system 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the lens system 3 diverges the light passing therethrough, the focus position Pf is located remote from the lens system 3 and the focal length Df is largest.

The refractive index distribution W is again flat in the state shown in FIG. 4(D), where the lens system 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focus-position-variation waveform Mf in FIG. 4.

By applying the pulsed illumination on the target object 9 at the focus position Pf at a desired time in the focus-position-variation waveform Mf and detecting an image illuminated at this time, the image of the illuminated target object at the focus position Pf at a desired focal length Df (i.e. at a desired illumination timing) can be obtained.

Referring back to FIG. 1, the oscillation of the lens system 3, the illumination of the pulsed light illuminator 5 and the image-detection of the image detector 4 of the variable focal length lens device 1 are controlled based on the drive signal Cf, the illumination signal Ci and an image-detection signal Cc from the lens controller 6. The controller PC 7 is connected in order to, for instance, configure the setting of the lens controller 6 that controls the above components.

Figure 5:
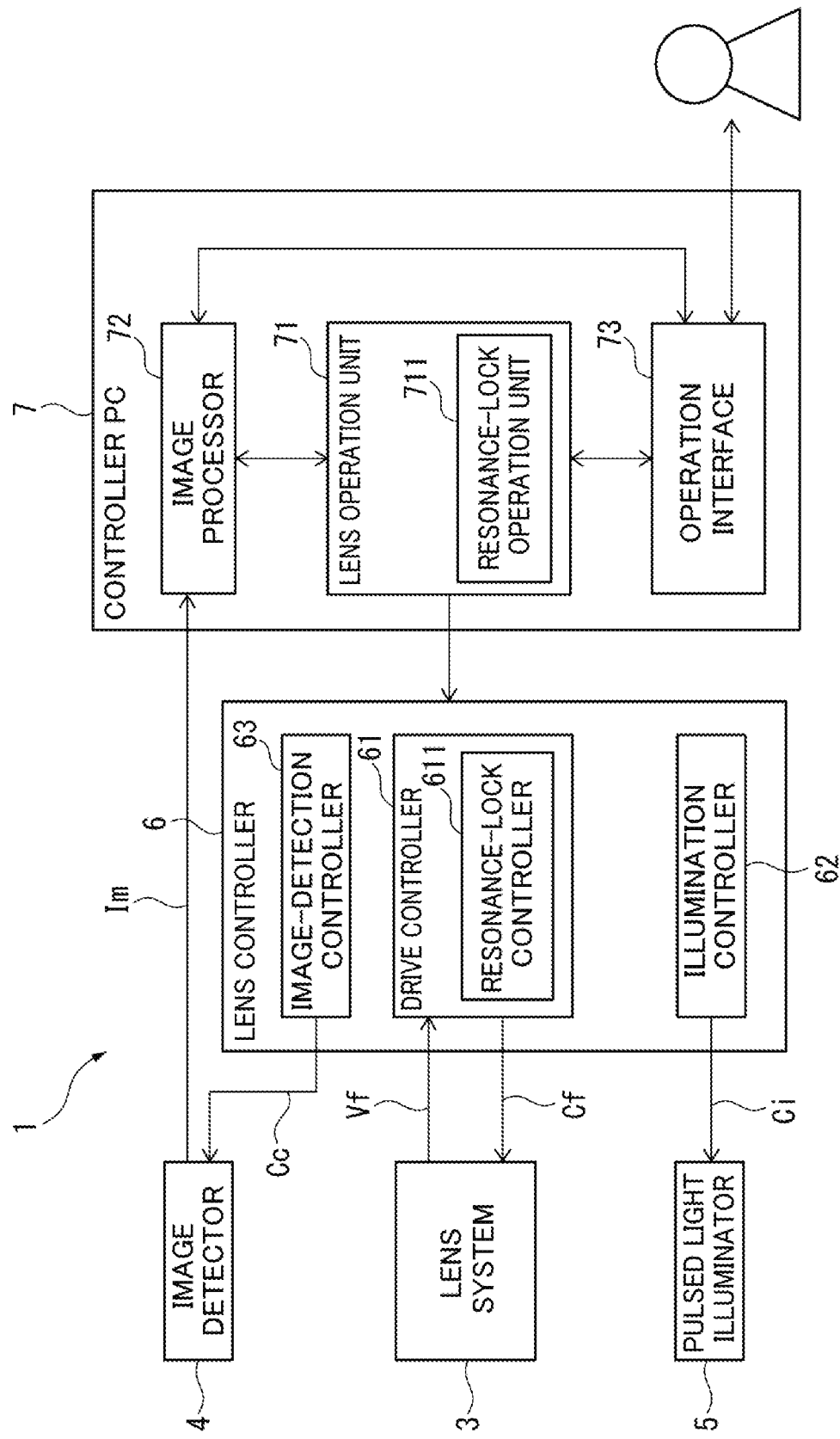
FIG. 5 is a block diagram showing a relevant part of the exemplary embodiment.

As shown in FIG. 5, the lens controller 6 includes: a drive controller 61 configured to output the drive signal Cf to the lens system 3; an illumination controller 62 configured to output the illumination signal Ci to the pulsed light illuminator 5; and an image-detection controller 63 configured to output the image-detection signal Cc to the image detector 4.

The drive controller 61 includes a resonance-lock controller 611.

The resonance-lock controller 611 is configured to detect oscillation conditions Vf of the lens system 3 based on an effective power Rp or a drive current Ri applied to the lens system 3 when the lens system 3 is oscillated in response to the inputted drive signal Cf. The resonance-lock controller 611 tunes the frequency of the drive signal Cf with reference to the oscillation conditions Vf of the lens system 3 to allow the frequency of the drive signal Cf to be locked to a current resonance frequency of the lens system 3. It should be noted that the oscillation conditions Vf may be detected by an oscillation sensor disposed in the lens system 3.

Figure 6:
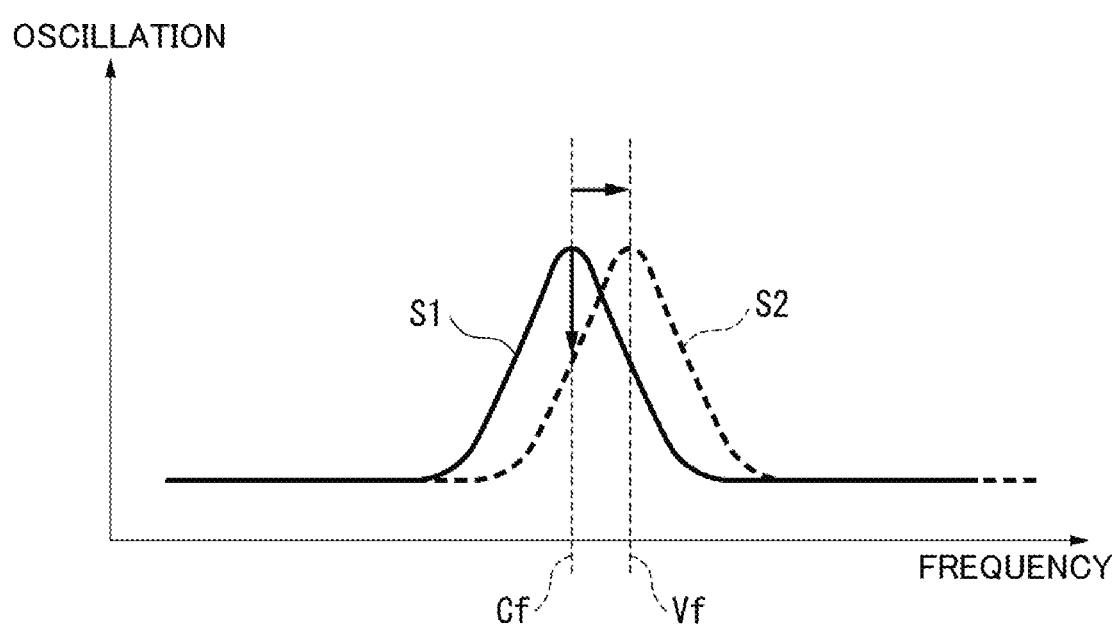
FIG. 6 is a graph showing a change in a resonance frequency in the exemplary embodiment.

Assuming that the oscillation characteristics of the lens system 3 are represented by S1 in FIG. 6, the frequency of the drive signal Cf is set at the peak of the oscillation characteristics S1. In the absence of any temperature change in the lens system 3, the frequency at the peak position of the oscillation characteristics of the lens system 3 detected by the resonance-lock controller 611 stays at the frequency at the peak of the oscillation characteristics S1 of the drive signal Cf.

With regard to the above, it is supposed that the oscillation characteristics of the lens system 3 are changed to S2 due to the temperature change and the like. Then, the oscillation characteristics of the lens system 3 detected by the resonance-lock controller 611 show a different peak (i.e. the peak of the oscillation characteristics S2), which is shifted from the peak of the drive signal Cf. If the drive signal Cf is inputted to the lens system 3 having the oscillation characteristics S2, the frequency of the drive signal Cf, which does not match the peak position of the oscillation characteristics S2, cannot provide sufficient effective power to the lens system 3, thereby decreasing the efficiency.

Figure 7:
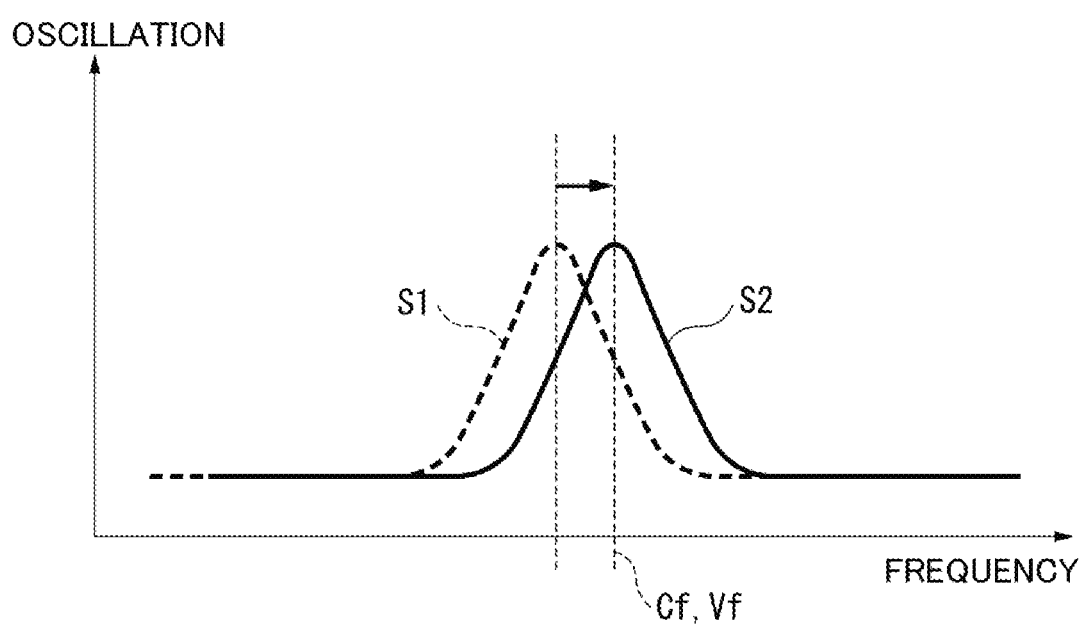
FIG. 7 is a graph showing a resonance lock function in the exemplary embodiment.

As shown in FIG. 7, upon detecting a deviation between the detected oscillation conditions Vf of the lens system 3 and the drive signal Cf inputted from the drive controller 61 to the lens system 3, the resonance-lock controller 611 searches for and captures the current peak position of the lens system 3, and changes the frequency of the drive signal Cf outputted from the drive controller 61 to the frequency at the current peak position.

Consequently, the frequency of the drive signal Cf inputted from the drive controller 61 to the lens system 3 is tuned to the peak of the resonance frequency of the current oscillation characteristics S2 of the lens system 3, thereby automatically tuning the frequency to the resonance frequency.

Referring back to FIG. 5, the controller PC 7 includes: a lens operation unit 71 configured to operate the lens controller 6 (e.g. configure the setting of the lens controller 6); an image processor 72 configured to capture and process the detected image Im from the image detector 4; and an operation interface 73 configured to receive a user's operation on the variable focal length lens device 1.

The lens operation unit 71 includes a resonance-lock operation unit 711.

The resonance-lock operation unit 711 is configured to switch the state (i.e. enable/disable) of the resonance-lock controller 611 of the drive controller 61.

Specifically, the resonance-lock operation unit 711 is configured to: refer to the timing for the image processor 72 to capture the detected image Im from the image detector 4; suspend the locking operation of the resonance-lock controller 611 in synchronization with the start of the image capturing; and resume the locking operation of the resonance-lock controller 611 in synchronization with the end of the image capturing.

Figure 8:
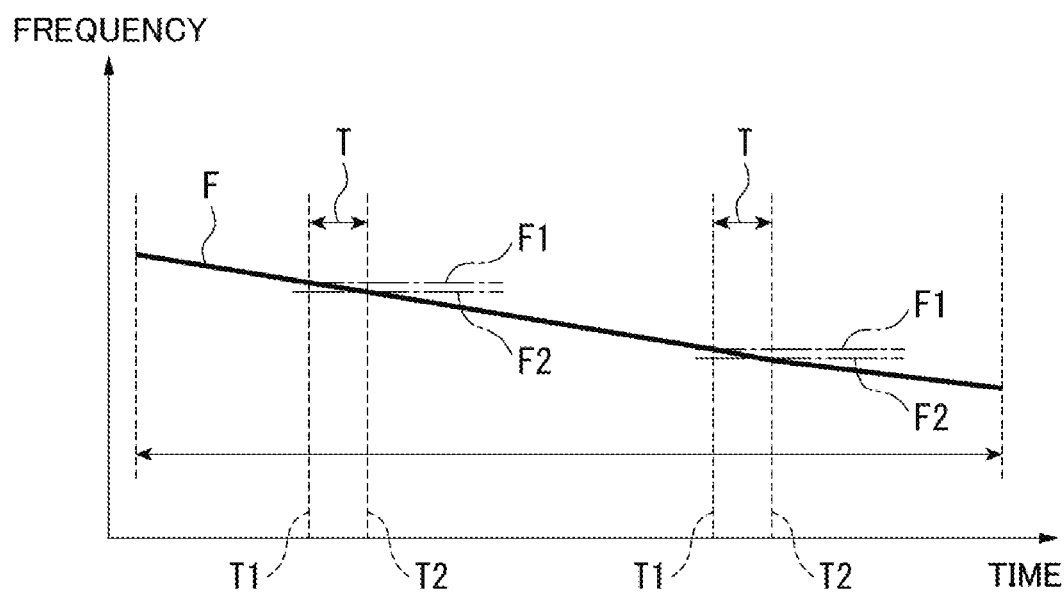
FIG. 8 is a graph showing an image detection during a resonance lock operation in the exemplary embodiment.

FIG. 8 shows a resonance frequency F, which is gradually decreased due to, for instance, change in the temperature inside the lens system 3.

It is supposed that the operation of the image processor 72 to capture the detected image Im from the image detector 4 is conducted in a period T (start time: T1, end time: T2).

If the resonance-lock control is conducted by the resonance-lock controller 611, the resonance frequency F continues to change in the period T. Specifically, while the resonance frequency is F1 at the start time T1, the resonance frequency becomes F2 at the end time T2. The resonance-lock control, which changes the frequency of the drive signal Cf applied to the drive controller 61 at every moment, destabilizes the standing wave in the lens system 3 to reduce the accuracy of the detected image Im. Accordingly, the resonance lock is suspended.

Figure 9:
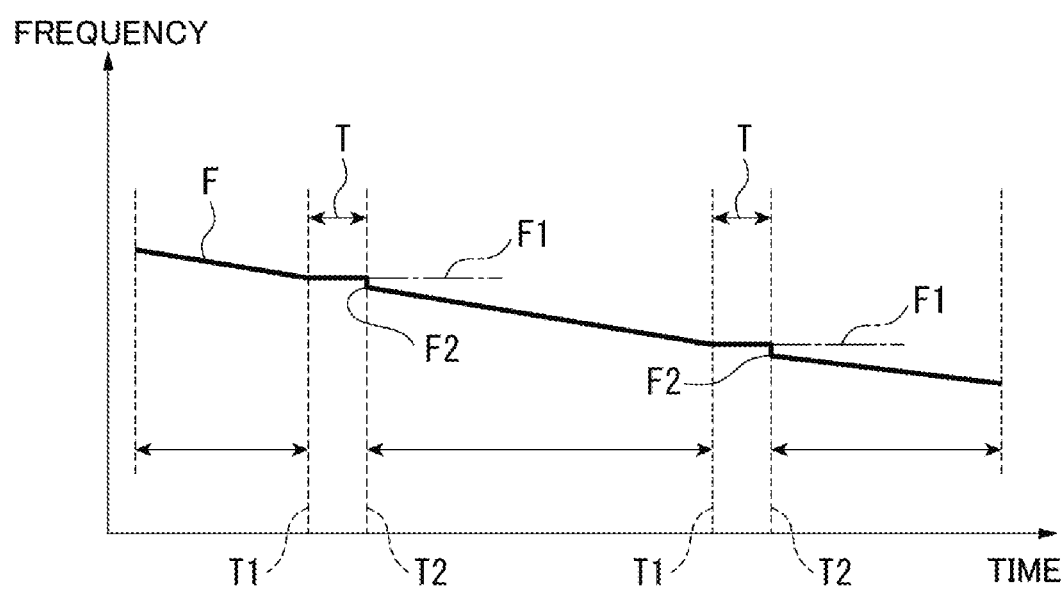
FIG. 9 is a graph showing an image detection during suspension of the resonance lock operation in the exemplary embodiment.

As shown in FIG. 9, the resonance-lock control by the resonance-lock controller 611 is suspended by the resonance-lock operation unit 711 in the period T for capturing the detected image Im in the exemplary embodiment.

The resonance-lock control by the resonance-lock controller 611 is suspended at the start time T1 in the period T, so that the resonance frequency F is maintained at the resonance frequency F1 of the start time T1. In this state, the detected image Im can be captured under a condition where the resonance frequency F is constant (i.e. with a stable standing wave).

At the end time T2 of the period T, the resonance-lock operation unit 711 controls the resonance-lock controller 611 to conduct the resuming operation, thereby resuming the resonance-lock control.

The resonance-lock operation unit 711 can be selectably set in a lock-suspension mode and a lock-continuation mode. These modes can be switched by a user using the operation interface 73.

In the lock-suspension mode, the resonance-lock operation unit 711 suspends (i.e. disables) the resonance-lock controller 611 in synchronization with the operation of the image processor 72 for capturing the detected image Im from the image detector 4.

In the lock-continuation mode, the resonance-lock operation unit 711 does not suspend the resonance-lock controller in synchronization with the operation of the image processor 72 for capturing the detected image Im from the image detector 4.

Accordingly, the selection of the lock-suspension mode allows the resonance-lock controller 611 to be automatically suspended to avoid the change in the resonance frequency F and to capture an image of a high accuracy. In contrast, the selection of the lock-continuation mode is beneficial when it is not necessary to automatically suspend the resonance-lock controller 611.

In the above exemplary embodiment, the standing wave is created in the lens system 3 in response to the drive signal Cf from the drive controller 61 of the lens controller 6 to change the refractive index of the lens system 3. Thus, the focus position Pf (the focal length DO of the variable focal length lens device 1 can be changed at the surface of the target object 9.

When light is emitted from the pulsed light illuminator 5 at a predetermined timing in response to the illumination signal Ci from the illumination controller 62 of the lens controller 6, the image Lg of the surface of the target object 9 at the focal length Df at the timing of the light emission is introduced to the image detector 4 through the objective lens 2 and the lens system 3. The image Lg can be detected by the image processor 72 of the controller PC 7 in the form of the detected image Im.

In the exemplary embodiment, the resonance-lock controller 611 can be enabled by the resonance-lock operation unit 711 by an operation on the lens operation unit 71 through the operation interface 73. When the resonance-lock controller 611 is enabled, the drive signal Cf is automatically tuned to the peak of the current resonance frequency of the lens system 3 to efficiently form the standing wave.

In contrast, when the image is detected by the image processor 72, the resonance-lock operation unit 711 temporarily suspends the automatic tuning by the resonance-lock controller 611 to keep the frequency of the drive signal Cf at a constant level during the image-detecting operation. As a result, the standing wave, which changes the refractive index of the lens system 3, is stabilized during the image detection, so that an image with a high accuracy can be obtained.

In the exemplary embodiment, the resonance-lock operation unit 711 suspends the resonance-lock controller 611 in synchronization with the image-detecting operation of the image processor 72. Accordingly, the resonance lock is automatically suspended in synchronization with the image-detecting operation without requiring a user's operation, thereby avoiding a mistake of, for instance, forgetting to enable the operation unit.

In the exemplary embodiment, the lock-suspension mode, in which the resonance-lock operation unit 711 suspends the resonance-lock controller 611 in synchronization with the image-detecting operation of the image processor 72, and the lock-continuation mode, in which the resonance-lock controller 611 is not suspended in synchronization with the image-detecting operation of the image processor 72, are selectable. The selection of the lock-suspension mode thus allows a user to obtain the above-described highly accurate image, while the selection of the lock-continuation mode is beneficial when it is not necessary to automatically suspend the resonance-lock controller 611.

It should be understood that the scope of the present invention is not limited to the above-described exemplary embodiment(s) but includes modifications and the like as long as the modifications and the like are compatible with the invention.

The lens controller 6 and the controller PC 7, which are used in combination in order to drive and control the lens system 3 in the above exemplary embodiment, may alternatively be an integrated device configured to start, control and operate the lens system 3. However, it should be noted that the combination of the lens controller 6 and the controller PC 7 as in the above exemplary embodiment can provide an independent hardware necessary for starting and controlling the lens system 3. Further, the operation and configuration of the setting of the lens controller 6 and also image capturing can be achieved using a versatile personal computer.

Though the drive signal Cf and the focus-position-variation waveform Mf are sinusoidal in the exemplary embodiment, the drive signal Cf and the focus-position-variation waveform Mf may alternatively have other waveform such as triangular waveform, saw-tooth waveform, rectangular waveform or the like.

The specific structure of the lens system 3 may be altered as necessary. For instance, the case 31 and the oscillator 32 are not necessarily cylindrical but may be hexagonal, and the dimension of the case 31 and the oscillator 32 and the nature of the liquid 35 may be altered as desired.

What is claimed is:

1. A variable focal length lens device comprising:
    a lens system whose refractive index is variable depending on an inputted drive signal;
    an objective lens disposed in an optical axis common to the lens system;
    an image detector configured to detect an image of a target object through the lens system and the objective lens;
    a resonance-lock controller configured to lock a frequency of the drive signal to a variable and temperature-dependent resonance frequency of the lens system, and
    a resonance-lock operation unit configured to switch enabling and suspending the resonance-lock controller.

2. The variable focal length lens device according to claim 1, wherein
    the resonance-lock operation unit is configured to suspend the resonance-lock controller in synchronization with an image-detecting operation by the image detector.

3. The variable focal length lens device according to claim 2, wherein
    the resonance-lock operation unit is configured to be selectively set in a lock-suspension mode, in which the resonance-lock operation unit suspends the resonance-lock controller in synchronization with the image-detecting operation of the image detector, and in a lock-continuation mode, in which the resonance-lock controller is not suspended in synchronization with the image-detecting operation of the image detector.

4. The variable focal length lens device according to claim 1, wherein
    the resonance-lock controller is configured to conduct a resuming operation in which the frequency of the drive signal is locked to the resonance frequency of the lens system.

5. A method of controlling a variable focal length lens device comprising: a lens system whose refractive index is variable depending on an inputted drive signal; an objective lens disposed in an optical axis common to the lens system; an image detector configured to detect an image of a target object through the lens system and the objective lens; and a resonance-lock controller configured to lock a frequency of the drive signal to a variable and temperature-dependent resonance frequency of the lens system, the method comprising:
    enabling the resonance-lock controller when the image is not detected by the image detector; and
    suspending the resonance-lock controller when the image detector detects the image.

* * * * *